Tzeng

United States Patent
Shvodian

(10) Patent No.: US 7,570,634 B2
(45) Date of Patent: Aug. 4, 2009

(54) PRIORITY QUEUING OF FRAMES IN A TDMA NETWORK

(75) Inventor: William M. Shvodian, McLean, VA (US)

(73) Assignee: Freescale Semiconductor, Inc., Austin, TX (US)

( * ) Notice: Subject to any disclaimer, the term of this patent is extended or adjusted under 35 U.S.C. 154(b) by 588 days.

(21) Appl. No.: 11/213,764

(22) Filed: Aug. 30, 2005

(65) Prior Publication Data

US 2007/0047563 A1    Mar. 1, 2007

(51) Int. Cl.
   *H04L 12/50*    (2006.01)
   *H04Q 11/00*    (2006.01)
(52) U.S. Cl. .................... 370/374; 370/412; 370/429
(58) Field of Classification Search ................. 370/310, 370/347, 412, 428, 429
   See application file for complete search history.

(56) References Cited

U.S. PATENT DOCUMENTS

| | | | | |
|---|---|---|---|---|
| 6,256,315 | B1 * | 7/2001 | Barbas et al. ............... | 370/412 |
| 6,438,135 | B1 * | 8/2002 | Tzeng ......................... | 370/412 |
| 6,747,976 | B1 | 6/2004 | Bensaou et al. | |
| 6,865,185 | B1 * | 3/2005 | Patel et al. .................. | 370/412 |
| 6,965,616 | B1 * | 11/2005 | Quigley et al. .............. | 370/480 |
| 2001/0055319 | A1 | 12/2001 | Quigley et al. | |
| 2002/0097733 | A1 * | 7/2002 | Yamamoto .................. | 370/412 |

* cited by examiner

*Primary Examiner*—Chirag G Shah
*Assistant Examiner*—Minh-Trang Nguyen

(57) ABSTRACT

A node (401) responsive to a TDMA protocol is provided. The node (401) can include a transceiver (403) and one or more processors (407) cooperatively operable with the transceiver (403). The processor (407) can be configured to facilitate receiving (413) one or more frames to be transmitted in a communication over the transceiver (403). The frame(s) can indicate a priority relative to other frames. The processor (407) can queue (415) the frame(s) in one of several queues in response to the priority. Each of the queues can correspond to a different priority. The queues are serviced (417), including processing the frame(s) in the queue(s).

17 Claims, 5 Drawing Sheets

PRIORITY QUEUING OF FRAMES IN A TDMA NETWORK

FIELD OF THE INVENTION

The present invention relates in general to communication networks, and more specifically to sharing a communication channel in a communication network.

BACKGROUND OF THE INVENTION

In communication networks where media is not shared among devices on the network, communications having various priorities conveniently can be handled by providing up to one queue per priority, regardless of the devices designated to receive the communications. Shared media protocols, on the other hand, including those operating under common IEEE standards generally known as 802.11 and 802.15.3, must allow sharing of media amongst devices. This can complicate the ability to share the media by priority, because the sharing is not just by multiple queues, but by multiple queues in each of the separate nodes in the network.

In response to the need to prioritize the sharing of media, the 802.11e standard utilizes various mechanisms such as prioritized carrier sense multiple access/collision avoidance ("CSMA/CA"). While the 802.15.3 standard provides reservation based QoS, it does not directly provide support for QoS based on packet by packet priorities.

The 802.15.3 standard is just one example of a variety of time division multiple access ("TDMA") protocols. TDMA protocols provide for sharing a single communication channel among simultaneous users of the channel by dividing the channel into time slots. When a device communicates in a network operating in accordance with TDMA, the device is assigned a specific time slot on the channel. By allowing several devices to use different time slots on a single channel, a network using a TDMA protocol can provide an ability to serve multiple devices with a limited number of channels.

The 802.15.3 standard supports the transmission of asynchronous traffic and/or isochronous traffic based on reservations from applications which identify stream types to a MAC ("media access control"). The MAC can allocate different time slots in a stream for devices in the network using the TDMA protocol to send and receive packets. Allocation of different types of streams can be requested in advance from the MAC. Nevertheless, many application programs and protocols do not support the explicit identification of streams. Also, most existing applications do not typically make bandwidth reservations in advance.

As suggested above, the 802.11e standard can support transmitting frames comprising a communication based on priorities. Applications are being developed that can tag packets with priorities. Consequently, support for transmitting frames based on priorities while utilizing TDMA protocols such as 802.15.3 is desired.

BRIEF DESCRIPTION OF THE DRAWINGS

The accompanying figures, where like reference numerals refer to identical or functionally similar elements and which together with the detailed description below are incorporated in and form part of the specification, serve to further illustrate an exemplary embodiment and to explain various principles and advantages in accordance with the present invention.

DETAILED DESCRIPTION

Figure 1:
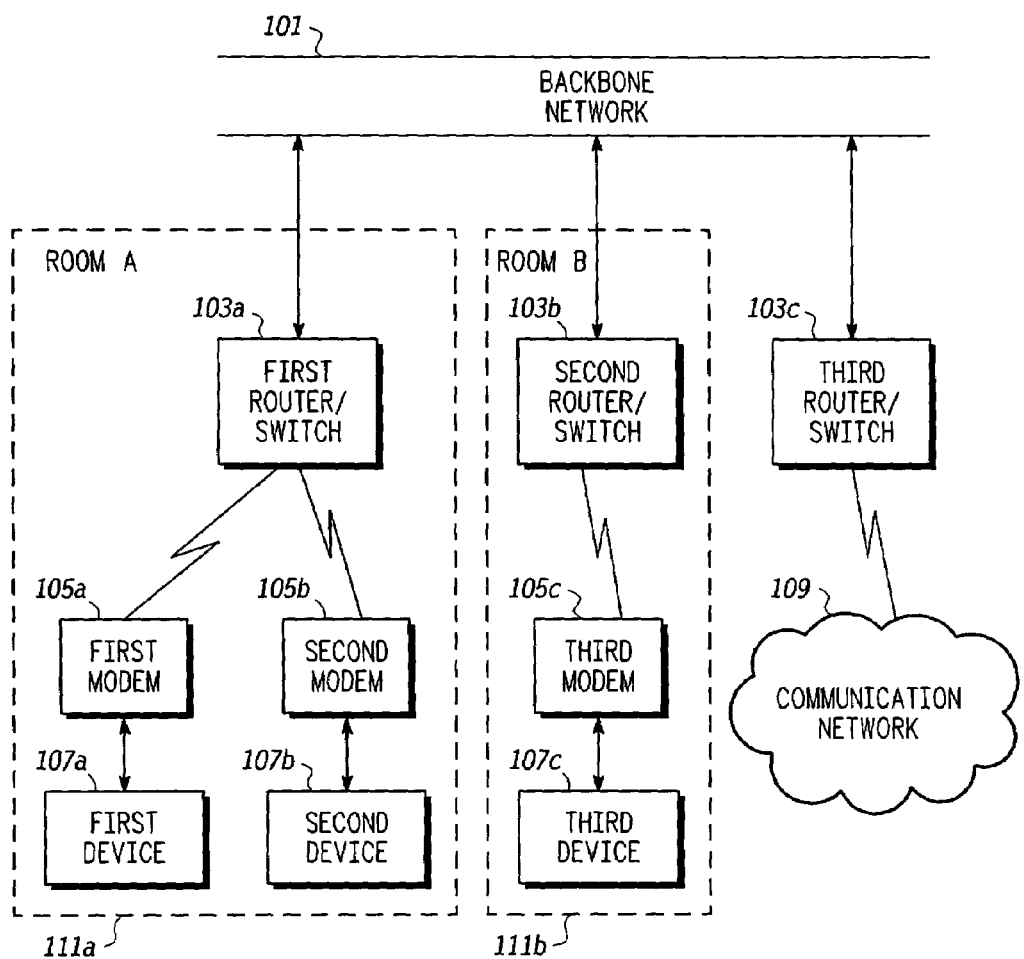
FIG. 1 is a diagram illustrating a simplified and representative environment associated with a node in an exemplary network in accordance with various exemplary embodiments.

In overview, the present disclosure concerns communications networks and devices (or "nodes") on a communication network having a capability of communicating with other nodes on the communication network, such as nodes associated with a TDMA network, for example, Ethernet, a piconet, or the like. Such communication networks are typically wireless, but can be wired in some implementations. More particularly, various inventive concepts and principles are embodied in systems, nodes, and methods therein for queuing frames associated with a communication between nodes in the communication network.

The instant disclosure is provided to further explain in an enabling fashion the best modes of performing one or more embodiments of the present invention. The disclosure is further offered to enhance an understanding and appreciation for the inventive principles and advantages thereof, rather than to limit in any manner the invention. The invention is defined solely by the appended claims including any amendments made during the pendency of this application and all equivalents of those claims as issued.

It is further understood that the use of relational terms such as first and second, and the like, if any, are used solely to distinguish one from another entity, item, or action without necessarily requiring or implying any actual such relationship or order between such entities, items or actions. It is noted that some embodiments may include a plurality of processes or steps, which can be performed in any order, unless expressly and necessarily limited to a particular order; i.e., processes or steps that are not so limited may be performed in any order.

Much of the inventive functionality and many of the inventive principles when implemented, are best supported with or in software or integrated circuits (ICs), such as a digital signal processor and software therefore or application specific ICs. It is expected that one of ordinary skill, notwithstanding possibly significant effort and many design choices motivated by, for example, available time, current technology, and economic considerations, when guided by the concepts and principles disclosed herein will be readily capable of generating such software instructions or ICs with minimal experimentation. Therefore, in the interest of brevity and minimization of any risk of obscuring the principles and concepts according to the present invention, further discussion of such software and ICs, if any, will be limited to the essentials with respect to the principles and concepts used by the exemplary embodiments.

As further discussed herein below, various inventive principles and combinations thereof are advantageously employed to support prioritized frames in communications between nodes in a TDMA network.

Further in accordance with exemplary embodiments, a computer network, for example, a personal area network (PAN), can be used for communicating among devices on the network, and/or for connecting to another network and/or the Internet. Communications can be serviced based on priority. Optionally, one or more embodiments can provide reservations of time slots for frames, such as that which is indicated as being high priority. Optionally, one or more embodiments can support explicitly identifying a stream to be associated with a particular communication.

FIG. 1 provides an overview of a representative network, utilized for discussing various embodiments. Referring now to FIG. 1, a diagram illustrating a simplified and representative environment associated with a node in an exemplary network in accordance with various exemplary embodiments will be discussed and described.

The environment of the network can include a backbone network 101, one or more routers and/or switches, here represented by first router/switch 103a, second router/switch 103b, and third router/switch 103c; and a communication network 109, for example, the Internet.

In the example communication network, devices represented by the first router/switch 103a, a first device 107a and a second device 107b act as nodes in a first network 111a and can communicate with each other and/or with other devices over the backbone network 101 and/or communication network 109. The second router/switch 103b and a third device 107c act as nodes in a second network 111b, which can communicate with other devices that may join its network, and with other devices over the backbone network 101 and/or the communication network 109. The devices 107a-107c and the routers/switches 103a-103c act as nodes in their respective networks 111a, 111b.

The devices 107a-107c can be wired and/or can be wireless (as illustrated). In the illustrated wireless network, one of the devices 107a-107c can communicate wirelessly with the router/switch 103a-103b in its respective network 111a, 111b via a modem associated with the device, represented respectively by a first modem 105a, a second modem 105b, and a third modem 105c. Additional elements can be included in the first network 111a and second network 111b, as will be known to those practicing in this field, although they are omitted from this simplified and representative network for clarity of discussion.

In the present example, the first and second networks 111a, 111b together form a home network (HHN), utilizing conventional short range wireless communications, although other known forms of wireless and/or wired communication can be supported in various embodiments. Accordingly, the first and second routers/switches 103a-103b can be provided in separate rooms, for example, Room A and Room B. The routers and/or switches, modems, and devices in one room conveniently can form a master-slave PAN, which is sometimes referred to as a piconet. For example, the first router/switch 103a, first and second modems 105a, 105b and first and second devices 107a, 107b form a first piconet, that is the first network 111a; and the second router/switch 103b, third modem 105c and third device 107c form a second piconet, that is the second network 111b. A conventional piconet is composed of up to eight active devices in a master-slave relationship, potentially having additional devices connected but inactive.

Any device in the network can act as a master, or more particularly, a piconet controller ("PNC") for the devices in the piconet, and synchronizes access to other networks, for example the backbone network 101. The devices in each network 111a, 111b can communicate with other devices in the respective networks 111a, 111b in accordance with known techniques and protocols. Further, the devices can communicate to nodes outside their respective networks 111a, 111b, for example, via the backbone network 101, third router/switch 103c, and/or communication network 109 in accordance with known techniques and protocols (although it should be understood that a node utilizing conventional TDMA network techniques does nothing in particular with frames tagged with priority). For example, the devices can transmit frames including indications of priority, which are to be communicated to other nodes on the network(s).

Figure 2:
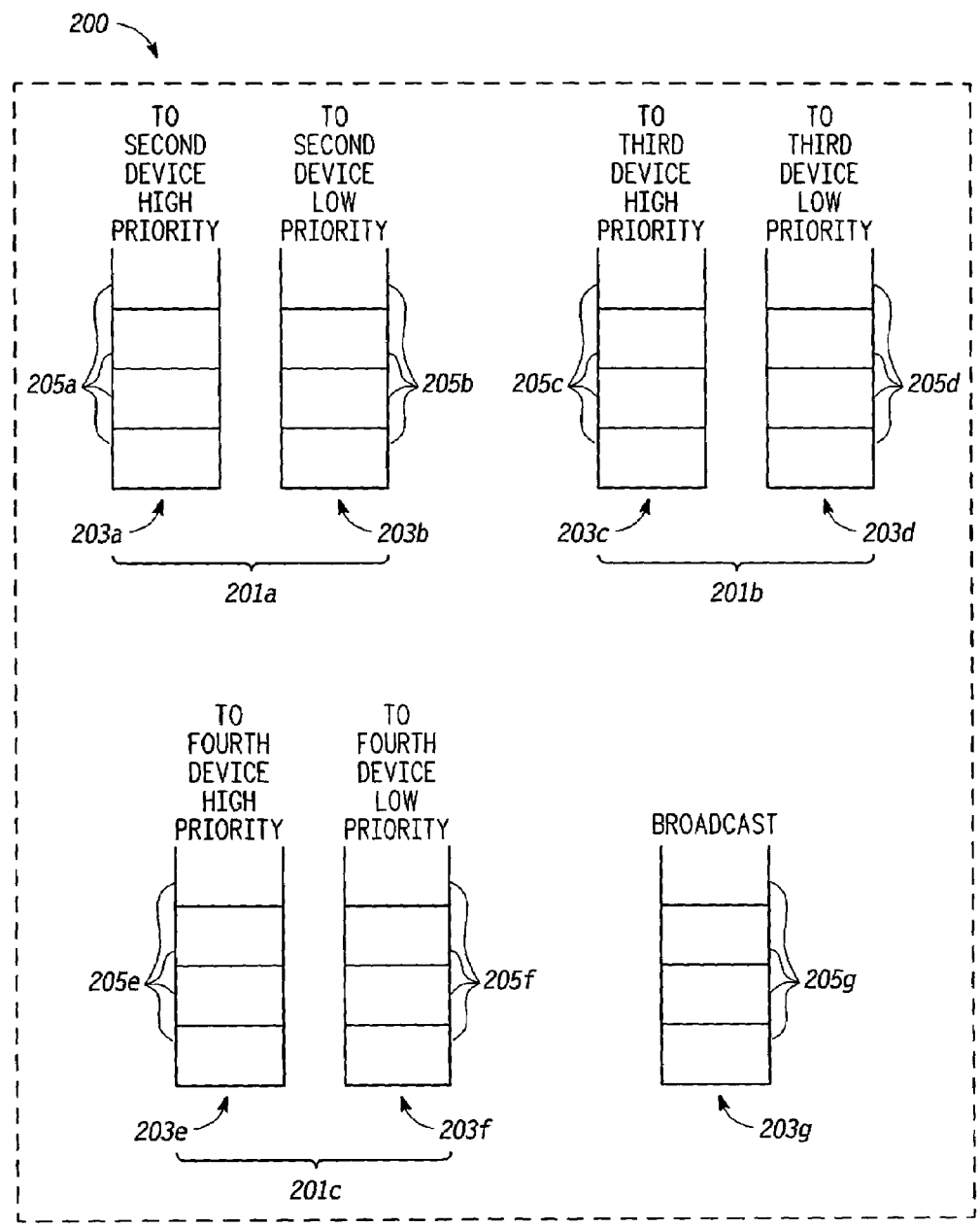
FIG. 2 is a diagram illustrating exemplary queues in a node in accordance with various exemplary embodiments.

Referring now to FIG. 2, a diagram illustrating exemplary queues in a node in accordance with various exemplary embodiments will be discussed and described. Utilization of the queues enables the node in a TDMA network, for example, operating in accordance with the 802.15.3 standard, to support frames that are identified with a priority.

A frame can be identified with a priority. For example, a frame that is part of a communication to be sent which arrives at a media access control (MAC) can include a priority tag, a priority flag, a priority bit, priority field, an identifier associated with a priority, a link to priority, a priority parameter, or the like. Priority tags are identified in various standards, for example, as in priority tags (extra fields) in the frame format and associated procedures recommended in the 802.1Q standard (expressly incorporated herein by reference).

A number of priorities can be supported. At least two priorities can be supported, for example, low priority and high priority; however, more than two priorities can be supported. For example, the 802.1D standard (expressly incorporated herein by reference) recommends eight priorities (best effort, excellent effort, background, voice, controlled load, video, network control).

The priorities can be mapped to queues. Where the priorities are high priority and low priority, the mapping to a high priority queue and low priority queue is straightforward. For example, considering the 802.1D standard, best effort, excellent effort, and background priorities can be mapped to a low priority queue; and voice, controlled load, video, and network control can be mapped to a high priority queue.

Optionally, a set of queues corresponding to the priorities (or priorities as mapped) can be provided per destination, where a destination is a node (i.e., device) on the network. Operation appears to be most efficient when two queues are provided in the set of queues, as in the examples provided herein, although three or more queues are possible. Furthermore, providing a set of queues per destination can avoid a problem where one of the queues is blocked by a busy destination. Alternative embodiments provide that the set of queues is for more than one destination. The illustrated embodiment utilizes a set of queues 201a, 201b, 201c per destination.

One or more embodiments can provide reservations of time slots for frames, such as that which is indicated as being high priority. A time slot is reserved by making a request for a time slot, which will then be allocated to a particular destination device. Because the time slot has been reserved in advance, latency incurred for setting up a time slot on a frame by frame basis can be avoided. However, channel reservation requirements may not completely be known in advance due to, for example, variable rate traffic sources, random packet errors, varying channel conditions, and the like.

In the example illustrated in FIG. 2, a plurality 200 of queues is provided on one of the devices in the network. In the exemplary embodiment, the sets of queues 201a-201c are provided for destination devices (that is, other than the device handling the queues). In the present example, there are sets of queues for communications to the second device 201a, third device 201b, and fourth device 201c. Optionally, one or more other queues and/or sets of queues can be provided for destinations, such as the illustrated broadcast queue 203g. In the present example, there are provided two queues (high priority 205a, 205c, 205e and low priority 205b, 205d, 205f) in each set of queues 201a, 201b, 201c, per destination device.

The plurality 200 of queues on a particular device can omit queues corresponding to that particular device, because the particular device will not be a destination for its own transmissions. In the illustrated embodiment, the plurality 200 of queues is on the first device; consequently, there is no set of queues for the first device.

Each of the queues 203a-203g holds frames 205a-205g. Frames have a format which is in accordance with the pertinent standard, for example, 802.13.5. The destination device and the priority can be indicated in association with the frame. For example, the destination and/or priority can be specified in the frame in accordance with the pertinent standard. For example, the frame header can include a particular field indicating the priority, and another field indicating the destination device. As another example, the application desiring to transmit the communication incorporating the frames can specify a priority and/or destination, and the destination/priority can be passed (such as in a mailbox or as a parameter) with a transmission request. One or more embodiments provide that a stream in the communication network can be identified for a frame.

The frames 205a-205g can be queued by priority and/or destination in the corresponding queue. When the frame is received, the corresponding queue can be determined by obtaining the identity of the destination device and the priority associated with the frame. The priority can be mapped to the queue. The frame can then be queued in the appropriate queue for the destination device. If the frame is intended to be broadcast to the devices in the network, the frame can be placed in the broadcast queue 203g. One or more other multicast queues can also be provided utilizing similar principles in alternative embodiments. The frames can be stored in the queue until they are transmitted. The frames can be queued in a first-in, first-out order.

Accordingly, one or more embodiments provide that the plurality of queues comprises a low priority queue and a high priority queue, and each of the queues further corresponds to a different destination, wherein the at least one frame indicates a next destination, and wherein the queuing is further responsive to the next destination, wherein the low priority queue and the high priority queue are provided for each destination. Alternatively, one or more embodiments provide that at least one queue further corresponds to a different destination, the at least one frame indicates a next destination, and the queuing is further responsive to the next destination.

In accordance with one or more embodiments, the plurality of queues comprises a low priority queue and a high priority queue for each destination, wherein at least one frame indicates a next destination, and wherein the queuing is further responsive to the next destination. One or more embodiments further comprises providing a queue for at least one priority, corresponding to each destination, wherein at least one frame is further queued responsive to a next destination indicated in the at least one frame.

In accordance with one or more embodiments, each of the queues further corresponds to a different destination, wherein at least one frame indicates a next destination, and wherein the queuing is further responsive to the next destination.

The queues can be serviced in any order that is desired. For example, the queues can be serviced in accordance with various round robin algorithms. For example, one frame from each high priority queue can be handled, followed by one frame from each low priority queue. As another example, one frame from each queue in a set of queues can be handled for each device, in order. Other queuing techniques for servicing queues may be utilized, such as weighted fair queuing and priority queuing. A frame that has been serviced can be transmitted.

Accordingly, one or more embodiments provides that the servicing of the plurality of queues is in round robin order, and each of the queues are serviced in an order such that frames in a higher priority queue are transmitted ahead of frames in a lower priority queue.

One or more embodiments can provide that a frame is not removed from the queue until it is successfully transmitted. One or more embodiments can provide for not re-transmitting a frame after an unsuccessful transmission until the next pass through the queue servicing routine. This can avoid a problem where a queue is blocked, such as by a non-responsive destination. Accordingly, one or more embodiments provide that, if the at least one frame is to be retransmitted, the queue is serviced after the other queues in the plurality of queues are serviced.

One or more embodiments provides for transmitting frames for devices that are known to be listening. Standards such as 802.15.3 provide a mechanism for determining which devices are listening. Accordingly, frames in the queue can be skipped and not transmitted if the destination is known to not be listening.

A frame can be transmitted on the network to the destination in accordance with known techniques for transmitting TDMA communications. Optionally, the frames can be included as part of a communication of a plurality of frames, such as in a superframe. Various standards define formats for superframes. A superframe can include fields indicating the start of the superframe as well as other fields for managing the communication which will not be further described. The superframe can also include fields which are to contain one or more frames. In accordance with one or more standards, the fields can be defined as limited to particular formats and/or devices.

Figure 3:
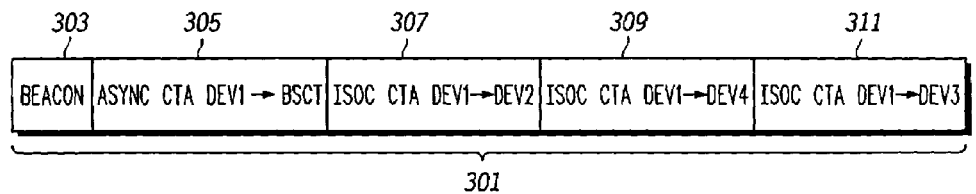
FIG. 3 is a block diagram illustrating an exemplary superframe in accordance with various exemplary embodiments.

Referring now to FIG. 3, a block diagram illustrating an exemplary superframe 301 in accordance with various exemplary embodiments will be discussed and described. The illustrated superframe 301 includes a beacon 303 in accordance with known formats, optionally one or more asynchronous CTAs 305, and optionally one or more isochronous CTAs 307, 309, 311.

In the illustrated example, the asynchronous CTA 305 contains one or more frames from device 1 which are to be broadcast. The isochronous CTAs 307, 309, 311 include: one or more frames from device 1 to device 2 307, one or more frames from device 1 to device 4 309, and one or more frames from device 1 to device 3 311. Accordingly, one or more embodiments can provide that each of the queues is associated with a particular time slot of the communication.

The CTAs in the superframe can be created as needed when servicing the queue, in order to contain the frames obtained from the queues. Accordingly, one or more embodiments provides for associating a stream of frames with a time slot as needed for the at least one frame, if the at least one frame is high priority. Alternatively, one or more embodiments provides for creating and associating at least one stream with a time slot as needed for the at least one frame, if the at least one frame is high priority.

One or more embodiments provide that low priority frames can be transmitted in a particular CTA, such as the asynchronous CTA. Low priority frames may include basic network management information. In order to avoid starving the low priority frames, it may be desirable to reserve at least some minimum amount of channel time for the CTA assigned to the low priority frames.

In accordance with alternative embodiments, frames which are destined for an isochronous CTA instead can be transmitted in an asynchronous CTA when there is no asynchronous frame to be transmitted. Similarly, an alternative embodiment provides that frames which are destined for an asynchronous CTA can be transmitted instead in an isochronous CTA if there is no isochronous frame to be transmitted. An alternative embodiment provides that any frame can be sent in any CTA associated with a device that is listening (a feature that is permitted under the 802.15.3 standard, for example). Yet another alternative embodiment provides that, where no isochronous CTAs are allocated, isochronous frames can preempt asynchronous frames; that is, frames destined for the isochronous CTA instead can be transmitted in the asynchronous CTA ahead of asynchronous frames for the same destination.

A first exemplary embodiment provides that all transmissions are transmitted in a superframe in one or more asynchronous time slots, also referred to herein as channel time allocations (CTA), created by the device. A media access controller (MAC) on each device maintains at least two priority queues (high priority and low priority) per destination. The MAC services the queues utilizing a round robin routine, and re-transmission is attempted in a next pass through the queues by the round robin routine.

A second exemplary embodiment provides that a device maintains at least two priority queues (high priority and low priority) per destination, and that each transmission (such as a superframe) includes at least an asynchronous CTA. Frames having a low priority are transmitted in the asynchronous CTA. Frames having a high priority are transmitted in an isochronous CTA. The isochronous CTAs can be created as needed, for example responsive to a request for reservation of CTA, responsive to frames received for queuing, and/or responsive to looking ahead at frames in the queue. In accordance with one or more embodiments, a CTA that has been allocated can be modified to change the allocation. Optionally, high priority frames can be transmitted in the CTA allocated for low priority if no streams have been created. Optionally, high priority frames to the same destination can share the same CTA.

A third exemplary embodiment provides that a frame can indicate a stream on which a frame is to be transmitted. For example, utilizing Resource Reservation Protocol (RSVP), the stream can be identified by IP address, protocol and/or port number. Reservations for these streams can be made. CTAs are created for individual upper layer streams (as distinguished from having a single CTA for all high priority frames to a particular destination device). In this third embodiment, at least high priority and low priority queues are provided for each destination device.

Figure 4:
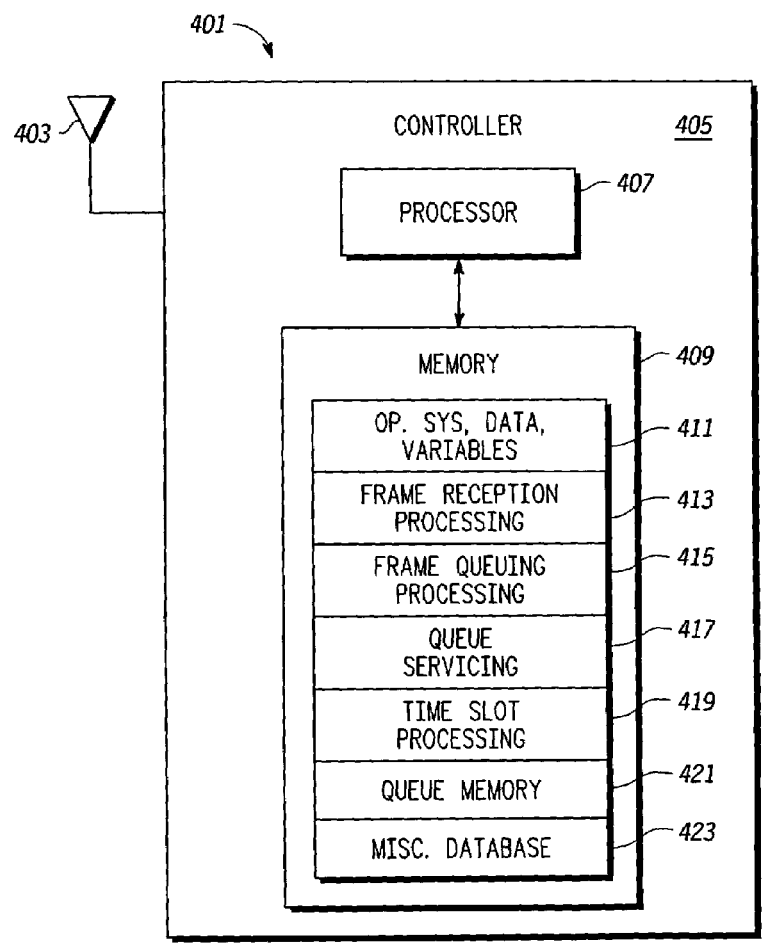
FIG. 4 is a block diagram illustrating portions of an exemplary node in accordance with various exemplary embodiments.

Referring now to FIG. 4, a block diagram illustrating portions of an exemplary node in accordance with various exemplary embodiments will be discussed and described. The node is one of the devices on the network, for example, a router, a switch, a modem, or one of the devices illustrated in FIG. 1.

The node 401 may include a controller 405, and a transceiver 403. The controller 405 as depicted generally includes a processor 407, a memory 409, and may include other functionality not illustrated for the sake of simplicity. The node can further include, if desired, additional functions which are not illustrated, for example, a speaker, a text and/or image display, and/or a user input device such as buttons or a keypad.

The processor 407 may comprise one or more microprocessors and/or one or more digital signal processors. The memory 409 may be coupled to the processor 407 and may comprise a read-only memory (ROM), a random-access memory (RAM), a programmable ROM (PROM), and/or an electrically erasable read-only memory (EEPROM). The memory 409 may include multiple memory locations for storing, inter alia, an operating system, data and variables 411 for programs executed by the processor 407; computer programs for causing the processor to operate in connection with various functions such as frame reception processing 413, frame queuing processing 415, queue servicing 417, time slot processing 419, and/or other processing (not illustrated); memory 421 for queues; and a database 423 for other miscellaneous information used by the processor 407. The computer programs may be stored, for example, in ROM or PROM and may direct the processor 407 in controlling the operation of the node 401. The computer programs can be provided in any computer-readable electronic format, including, for example, on magnetic media, on optical media. Accordingly, one or more embodiments provide a computer-readable medium comprising instructions executable by a processor.

The processor 407 may be programmed for frame reception processing 413. One or more frames to be transmitted are received. For example, a parameters can be passed or a process can receive a conventional transmit request specifying a communication that is to be transmitted over the transmitter, where the communication incorporates one or more frames.

Further, the processor 407 may be programmed for frame queuing processing 415. The frames that are to be transmitted can be queued. Queuing of a frame can be done responsive to a priority that is indicated for the frame. At least two queues and at least two priorities are supported. A queue to use for a particular frame can be determined by the frame's priority, for example by mapping the priority to a queue, as previously explained. In accordance with alternative embodiments, queuing can be responsive to a destination that is indicated for the frame.

Moreover, the processor 407 may be programmed for queue servicing 417. The queues can be serviced, wherein a frame in a queue is processed for transmitting, such as by inserting the frame into a channel for transmitting. One or more queuing algorithms can be utilized to determine which queue is to be serviced, as previously explained. Optionally, the queuing algorithm can also determine which frame in the queue is to be serviced, for example, skipping frames for non-listening devices. The node 401 can transmit the frame when it transmits the data on the channel in accordance with known techniques. One or more embodiments can provide that the fame is transmitted as part of a superframe.

The processor 407 also can be programmed for time slot processing 419. In the time slot processing, the processor 407 can determine a time slot to be associated with the frame. In one or more embodiments, a time slot is associated with a particular device, so that the time slot for a particular frame is determined by the destination device of the frame. Alternatively, the processor 407 can allocate a time slot for the frame. Moreover, a stream in a time slot can be created or allocated for a frame.

Advantageously, the communications discussed above can be transmitted to other devices on the network. It can be advantageous to program the processor 407 so that one or more of the communications discussed above between the node and other devices are provided in accordance with standard communications protocols, for example, TDMA, such as 802.15.3.

Accordingly, one or more embodiments provides for a node responsive to a TDMA protocol. The node comprises a transceiver; and at least one processor cooperatively operable with the transceiver. The processor is configured to facilitate receiving at least one frame to be transmitted in a communication over the transceiver, wherein the at least one frame indicates a priority relative to other frames; queuing the at least one frame in one queue of a plurality of queues, responsive to the priority, wherein each of the queues in the plurality of queues correspond to at least one different priority of a plurality of priorities; and servicing the plurality of queues including processing the at least one frame in the one queue.

Figure 5:
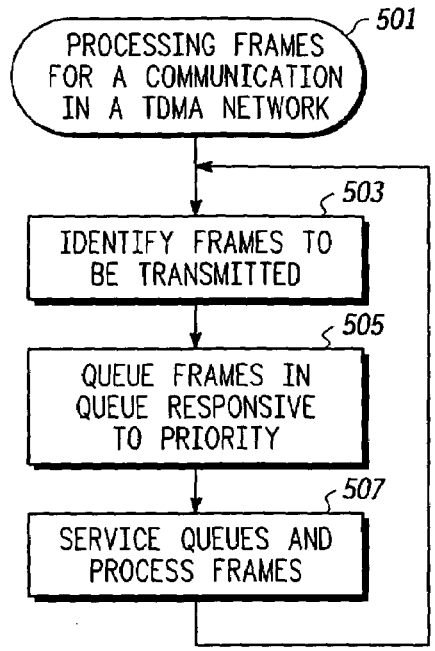
FIG. 5 is a flow chart illustrating an exemplary procedure for processing frames for a communication in accordance with various exemplary and alternative exemplary embodiments.
Figure 6:
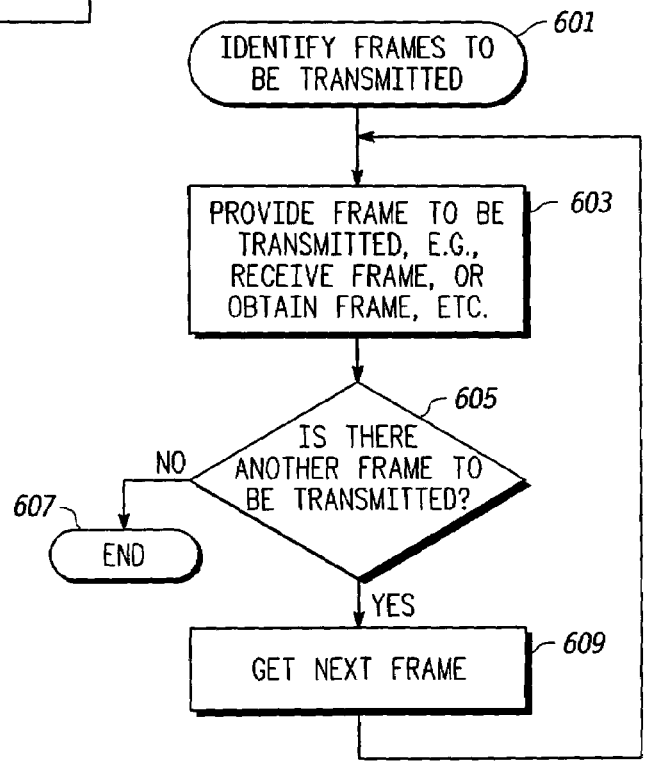
FIG. 6 is a flow chart illustrating an exemplary procedure for identifying frames to be transmitted in accordance with various exemplary embodiments.
Figure 7:
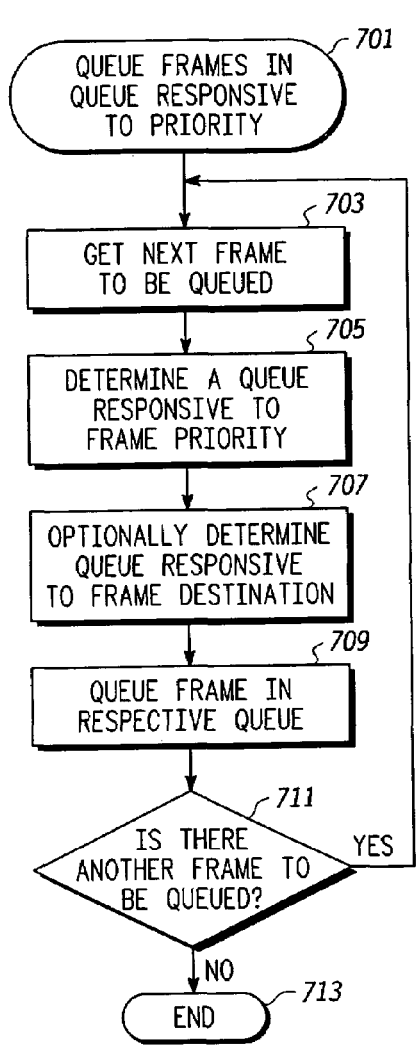
FIG. 7 is a flow chart illustrating an exemplary procedure for queuing frames in a queue responsive to priority in accordance with various exemplary embodiments.
Figure 8:
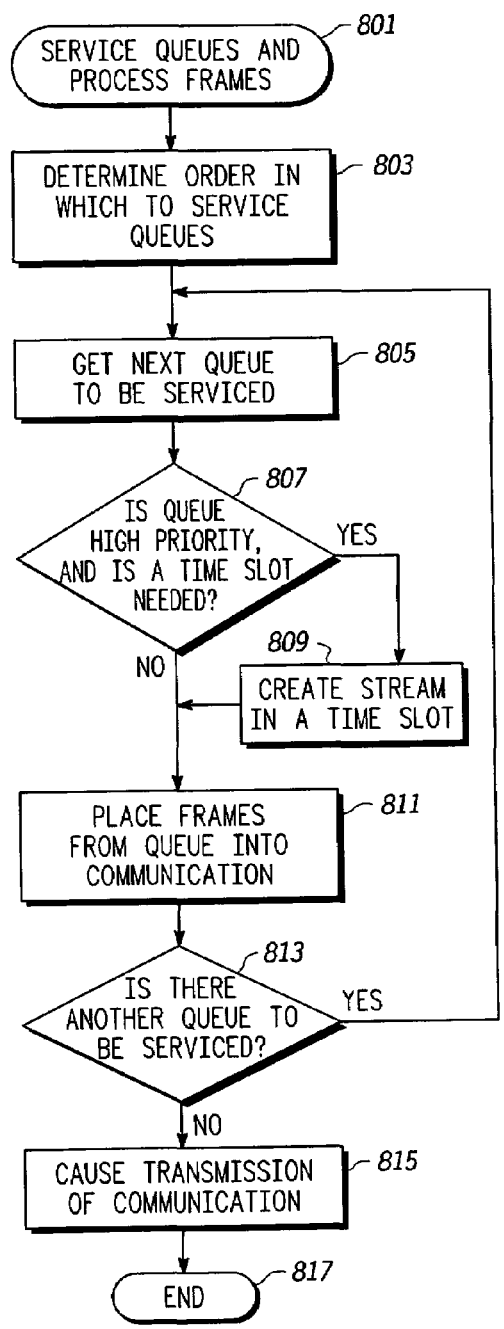
FIG. 8 is a flow chart illustrating an exemplary procedure for servicing queues and processing frames in accordance with various exemplary embodiments.

FIG. 5-FIG. 8 together illustrate an exemplary procedure for processing frames for a communication, with FIG. 5 providing a top level exemplary process, and FIG. 6-8 providing more detailed explanations of the top level processes illustrated in FIG. 5. Each of the procedures discussed in FIG. 5-FIG. 8 can advantageously be implemented on, for example, a processor of a node, described in connection with FIG. 4 or other apparatus appropriately arranged.

Referring now to FIG. 5, a flow chart illustrating an exemplary procedure for processing frames for a communication in a TDMA network 501 in accordance with various exemplary and alternative exemplary embodiments will be discussed and described.

The procedure provides for identifying 503 frames to be transmitted. Then, each of the frames is queued 505 in a queue responsive to a priority associated with each frame.

The queues are serviced 507 and the frames are processed. It will be appreciated that servicing 507 of the queues can be implemented as a separate process from the identifying 503 of frames and queuing 505 of frames, if preferred. Detailed discussion of each of the procedures 503, 505, 507 is provided below in connection with FIG. 6, FIG. 7 and FIG. 8, respectively.

Accordingly, one or more embodiments provides a method of processing frames for a communication in a TDMA network, comprising: identifying frames to be transmitted, where each frame is associated with a priority; queuing the frames in at least one queue of a plurality of queues, responsive to the priority associated therewith, wherein each of the queues of the plurality of queues correspond to at least one different priority of a plurality of priorities; and servicing the plurality of queues including processing the frames in the at least one queue.

Accordingly, one or more embodiments can provide instructions including a computer-implemented method for processing frames for communication in a TDMA network, the instructions for implementing the steps of: providing frames to be transmitted, where each frame is associated with a priority; for each frame, determining a queue of a plurality of queues responsive to the priority of each frame, wherein each of the queues of the plurality of queues correspond to at least one different priority of a plurality of priorities; queuing the frames in the respective queues responsive to the determining; and servicing the at least one queue including processing the frames in the at least one queue.

Referring now to FIG. 6, a flow chart illustrating an exemplary procedure for identifying frames to be transmitted 601 in accordance with various exemplary embodiments will be discussed and described. In overview, the illustrated exemplary procedure of identifying frames to be transmitted 601 can include providing the frame to be transmitted 603 in various ways, checking for another frame 605, getting 609 the next frame if there is another, and looping to process the next frame.

The procedure can provide the frame to be transmitted 603 in various ways. For example, the procedure can receive the frame by being called from another task, can receive the frame passed as a parameter, can obtain the frame such as when triggered that a frame is available, or can obtain the frame to be transmitted in a variety of other ways that will be apparent in this technical field.

Once the frame to be transmitted is obtained, the procedure can check whether there is another frame 605 that is to be transmitted. If not, the procedure can end 607, returning the frame(s) that were identified.

Otherwise, there are multiple frames to be transmitted, which can be identified. The procedure can get 609 the next frame if there is another, and loop to provide 603 the next frame to be transmitted, as described above. Therefore, multiple frames can be identified for transmission.

Referring now to FIG. 7, a flow chart illustrating an exemplary procedure for queuing frames in a queue responsive to priority 701 in accordance with various exemplary embodiments will be discussed and described. In overview, the illustrated exemplary procedure includes getting 703 the next frame to be queued, determining 705 a queue responsive to the frame priority, optionally determining 707 a queue responsive to the frame destination, queuing 709 the frame in the respective queue, looping 711 for any other frames, before ending 713 the procedure.

The procedure can include getting 703 the next frame to be queued. The exemplary procedure described here assumes that the frames to be queued have been identified, such as by the previously described procedure, and are awaiting further processing. Thus, the procedure can get the next frame in an appropriate manner.

Then, the procedure can provide for determining 705 a queue responsive to the frame priority. As previously described, the frame can be identified as having a particular priority, and queue can be associated with one or more priorities. The priority can be determined from the frame, and the queue for the frame can be determined from the priority.

One or more embodiments can include determining 707 a queue responsive to the frame destination. Various embodiments provide a set of queues corresponding to one or more destination devices. The destination device can be determined from the frame, and the queue for both the device and the priority can be determined from the combination.

The procedure can provide for queuing 709 the frame in the respective queue. Having identified the queue, the frame can be inserted into the respective queue. Various techniques for adding items to queues are known and can be utilized to insert the frame into the queue.

The procedure can check 711 whether there is another frame to be queued. If there is another frame, the procedure can repeat for other frames. When there is no other frame to be queued, the procedure can end 713.

Accordingly, one or more embodiments can provide for associating each queue of the plurality of queues with a slot in a TDMA protocol allocation.

Referring now to FIG. 8, a flow chart illustrating an exemplary procedure for servicing queues and processing frames 801 in accordance with various exemplary embodiments will be discussed and described. In overview, the procedure 801 can include determining 803 the order in which to service the queues, getting 805 the next queue to be serviced, determining 807 whether a time slot is needed for a high priority queue and creating 809 a stream in the time slot if needed, placing 811 the frame or frames from the queue into the communication, and perhaps repeating 813 the foregoing for additional queues. When the communication is prepared, the procedure can cause 815 its transmission.

The procedure can provide for determining 803 the order in which to service the queues. Various orders for servicing queues were previously described. If the order is not variable, subsequent execution of this procedure 801 can omit this determination.

After determining the order of servicing the queues, the procedure can get 805 the next queue to be serviced, in accordance with the order. For example, the first queue to be serviced may be the high priority queue for a first device, followed by the high priority queue for a second device, then high priority for a third device, and so on; followed by the low priority queues in order. In that event the first queue to be serviced will be the high priority queue for the first device.

The procedure can provide for determining 807 whether the queue is high priority, and if so, whether a time slot is needed corresponding to the high priority queue. If there is no available stream in the appropriate time slot corresponding to the device, the stream can be created 809 in the time slot. Techniques are known for creating streams in time slots.

The frame from the queue that is being serviced are then placed 811 into the communication, in accordance with conventional techniques. If called for by the queuing routine, multiple frames from the queue can be placed into the communication.

The procedure can check 813 whether there is another queue to be serviced. If there is another queue, the process can repeat for other queues.

When there is no other queue to be serviced, and/or alternatively when a communication is prepared, the procedure can cause 815 transmission of the communication in accordance with known techniques. The procedure can then end 817 its processing.

Accordingly, one or more embodiments provides that the servicing of the plurality of queues is in round robin order, wherein each of the queues are serviced in an order such that frames in a higher priority queue are transmitted ahead of frames in a lower priority queue.

Accordingly, one or more embodiments provides for creating a stream in a time slot as needed for the at least one frame, if the at least one frame is high priority.

Accordingly, one or more embodiments provides that the plurality of queues are serviced in an order such that frames in a higher priority queue are transmitted ahead of frames in a lower priority queue.

It should be noted that the term node may be used interchangeably herein with device. Each of these terms denotes a unit equipped for communication, typically wireless although it may be wired, which may be used with a public network, for example in accordance with a service agreement, or within a private network such as an enterprise network. Examples of such units include personal digital assistants, personal assignment pads, personal computers equipped for wired or wireless operation, routers, switches, access points, cellular handsets or devices, digital cameras, portable media players, wireless speakers, wireless home theater components, portable and handheld digital electronic devices, and/or equivalents thereof.

The communication systems and devices (or nodes) of particular interest are those providing for facilitating communication services or data or messaging services over TDMA networks, such as conventional two way systems and devices, various cellular phone systems including analog and digital cellular, CDMA (code division multiple access) and variants thereof, GSM (Global System for Mobile Communications), GPRS (General Packet Radio System), 2.5G and 3G systems such as UMTS (Universal Mobile Telecommunication Service) systems, Internet Protocol (IP) Wireless Wide Area Networks like 802.16, 802.20 or Flarion, integrated digital enhanced networks and variants or evolutions thereof.

Furthermore the nodes devices of interest may have short range wireless communications capability normally referred to as WLAN (wireless local area network) capabilities, such as IEEE 802.11, Bluetooth, or Hiper-Lan and the like preferably using frequency hopping, OFDM (orthogonal frequency division multiplexing) or TDMA (Time Division Multiple Access) access technologies and one or more of various networking protocols, such as TCP/IP (Transmission Control Protocol/Internet Protocol), UDP/UP (Universal Datagram Protocol/Universal Protocol), IPX/SPX (Inter-Packet Exchange/Sequential Packet Exchange), Net BIOS (Network Basic Input Output System) or other protocol structures. Alternatively the nodes or devices of interest may be connected to a LAN using protocols such as TCP/IP, UDP/UP, IPX/SPX, or Net BIOS via a hardwired interface such as a cable and/or a connector.

This disclosure is intended to explain how to fashion and use various embodiments in accordance with the invention rather than to limit the true, intended, and fair scope and spirit thereof. The invention is defined solely by the appended claims, as they may be amended during the pendency of this application for patent, and all equivalents thereof. The foregoing description is not intended to be exhaustive or to limit the invention to the precise form disclosed. Modifications or variations are possible in light of the above teachings. The embodiment(s) was chosen and described to provide the best illustration of the principles of the invention and its practical application, and to enable one of ordinary skill in the art to utilize the invention in various embodiments and with various modifications as are suited to the particular use contemplated. All such modifications and variations are within the scope of the invention as determined by the appended claims, as may be amended during the pendency of this application for patent, and all equivalents thereof, when interpreted in accordance with the breadth to which they are fairly, legally, and equitably entitled.

What is claimed is:

1. A node responsive to a TDMA protocol, comprising:
    a transceiver; and
    at least one processor cooperatively operable with the transceiver, and configured to facilitate
        receiving at least one frame to be transmitted in a communication over the transceiver, wherein the at least one frame indicates a priority relative to other frames;
        queuing the at least one frame in one queue of a plurality of queues, responsive to the priority, wherein each of the queues in the plurality of queues correspond to at least one different priority of a plurality of priorities; and
        servicing the plurality of queues including processing the at least one frame in the one queue,
    wherein each of the queues is associated with a particular time slot of the communication, and
    wherein the at least one processor is further configured to facilitate
        transmitting frames in a selected queue via an isochronous time slot if the selected queue corresponds to a high priority; and transmitting the frames in the selected queue via an asynchronous time slot if the selected queue corresponds to a low priority.

2. The node of claim 1, wherein the servicing of the plurality of queues is in round robin order, and wherein each of the queues are serviced in an order such that frames in a higher priority queue are transmitted ahead of frames in a lower priority queue.

3. The node of claim 1, further comprising creating a stream in a time slot as needed for the at least one frame, if the at least one frame is high priority.

4. The node of claim 1, wherein the plurality of queues comprises a low priority queue and a high priority queue, and each of the queues further corresponds to a different destination, wherein the at least one frame indicates a next destination, and wherein the queuing is further responsive to the next destination, wherein the low priority queue and the high priority queue are provided for each destination.

5. The node of claim 1, wherein at least one queue further corresponds to a different destination, wherein the at least one frame indicates a next destination, and wherein the queuing is further responsive to the next destination.

6. The node of claim 1, wherein, if the at least one frame is to be retransmitted, the queue is serviced after the other queues in the plurality of queues are serviced.

7. A method of processing frames for a communication in a TDMA network, comprising:
identifying frames to be transmitted, where each frame is associated with a priority;
queuing the frames in at least one queue of a plurality of queues, responsive to the priority associated therewith, wherein each of the queues of the plurality of queues correspond to at least one different priority of a plurality of priorities;
providing a queue for the at least one priority, corresponding to each destination; and
servicing the plurality of queues including processing the frames in the at least one queue,
wherein the at least one frame is further queued responsive to a next destination indicated in the at least one frame, and
wherein the servicing of the plurality of queues, further comprises:
transmitting frames in a selected queue via an isochronous time slot if the selected queue corresponds to a high priority; and
transmitting the frames in the selected queue via an asynchronous time slot if the selected queue corresponds to a low priority.

8. The method of claim 7, wherein the servicing of the plurality of queues is in round robin order, wherein each of the queues are serviced in an order such that frames in a higher priority queue are transmitted ahead of frames in a lower priority queue.

9. The method of claim 7, further comprising associating each queue of the plurality of queues with a slot in a TDMA protocol allocation.

10. The method of claim 7, further comprising associating a stream of frames with a time slot as needed for the at least one frame, if the at least one frame is high priority.

11. The method of claim 7, wherein the plurality of queues comprises a low priority queue and a high priority queue for each destination, wherein the at least one frame indicates a next destination, and wherein the queuing is further responsive to the next destination.

12. A computer-readable storage medium comprising instructions for execution by a computer, the instructions including a computer-implemented method for processing frames for communication in a TDMA network, the instructions for implementing the steps of:
providing frames to be transmitted, where each frame is associated with a priority;
for each frame, determining a queue of a plurality of queues responsive to the priority of each frame, wherein each of the queues of the plurality of queues correspond to at least one different priority of a plurality of priorities;
queuing the frames in the respective queues responsive to the determining; and
servicing the at least one queue including processing the frames in the at least one queue,
wherein the plurality of queues comprises a low priority queue and a high priority queue for each destination, wherein the at least one frame indicates a next destination, and wherein the queuing is further responsive to the next destination, and
wherein the servicing of the at least one queue, further comprises:
transmitting the frames in the at least one queue via an isochronous time slot if the at least one queue corresponds to a high priority; and
transmitting the frames in the at least one queue via an asynchronous time slot if the at least one queue corresponds to a low priority.

13. The computer-readable storage medium of claim 12, wherein the servicing of the plurality of queues is in round robin order.

14. The computer-readable storage medium of claim 12, wherein the plurality of queues are serviced in an order such that frames in a higher priority queue are transmitted ahead of frames in a lower priority queue.

15. The computer-readable storage medium of claim 12, further comprising instructions for associating each queue of the plurality of queues with a slot in a TDMA protocol allocation.

16. The computer-readable storage medium of claim 12, further comprising instructions for creating and associating at least one stream with a time slot as needed for the at least one frame, if the at least one frame is high priority.

17. The computer-readable storage medium of claim 12, wherein there is provided a queue for the at least one priority, corresponding to each destination, wherein the at least one frame is further queued responsive to a next destination indicated in the at least one frame.

* * * * *